United States Patent [19]

Moses

[11] 3,749,942

[45] July 31, 1973

[54] VOLTAGE TO FREQUENCY CONVERTER FOR LONG TERM DIGITAL INTEGRATION

[75] Inventor: Adrian John Moses, Newhall, Calif.

[73] Assignee: Lear Siegler, Inc., Santa Monica, Calif.

[22] Filed: Mar. 27, 1972

[21] Appl. No.: 238,186

[52] U.S. Cl. .................. 307/271, 307/232, 307/233, 307/235, 307/228, 307/261, 307/279, 328/150

[51] Int. Cl. ............................................. H03k 1/16

[58] Field of Search ...................... 328/155, 22, 150; 307/232, 233, 271, 228, 235, 261, 279

[56] References Cited

UNITED STATES PATENTS

| | | | |
|---|---|---|---|
| 3,376,431 | 4/1968 | Merrell | 307/271 X |
| 3,449,695 | 6/1969 | Marsh | 307/271 X |
| 3,643,113 | 2/1972 | Brock et al. | 307/271 X |

*Primary Examiner*—John S. Heyman
*Attorney*—Pastoriza & Kelly

[57] ABSTRACT

A variable d.c. input voltage signal is converted to a square wave of amplitude corresponding to the voltage level of the input signal. The square wave is integrated to provide a saw tooth wave the slope of which is a function of the amplitude of the square wave. This saw tooth is compared with a fixed reference voltage and a switching signal in turn is generated when the saw tooth crosses the amplitude limits of the fixed reference voltage. The switching signal is then utilized to control the switching of the converter generating the square wave so that the frequency of the switching signal is a function of the level of the input voltage signal. This frequency may be counted and converted to a d.c. voltage to provide a long term digital integration system.

7 Claims, 4 Drawing Figures

PATENTED JUL 31 1973

3,749,942

VOLTAGE TO FREQUENCY CONVERTER FOR LONG TERM DIGITAL INTEGRATION

This invention relates to voltage to frequency converting circuits and more particularly to an improved method and circuit for converting an input d.c. voltage signal into a series of digital type pulses of low frequency directly proportional to the input voltage level for long term digital integration.

BACKGROUND OF THE INVENTION

Voltage to frequency converter circuits are well known in the art. Usually these circuits are utilized to convert a d.c. voltage into an a.c. output signal of high frequency for use with various types of equipment. Certain of these circuits usually include a pair of switching transistors in combination with a saturable core transformer and may be "free running" or regulated by suitable circuitry. Other types may be in the form of a free running multivibrator. In the case of free running converters or multivibrators, the output frequency is usually high, that is, in the kilo-hertz range and is dependent mainly on the "time constants" of components in the circuit.

By properly designing circuits of the above type, it is possible to convert a d.c. voltage level into an output a.c. frequency signal which has a frequency constituting a function of the input voltage over a limited range. However, because the output frequency is high it is difficult to utilize the signal for long term digital integration purposes with an acceptable accuracy. By long term digital integration is meant the integration of a variable over a period of time of perhaps minutes or hours. An example would be the integration of velocity over a given period of time to determine the total distance of an object such as an airplane or drone from an initial starting point.

Lower frequency output signals proportional to an input voltage level may be provided by comparing the input voltage to a sweep generator operating at a relatively low frequency and generating output pulses at the cross-over points of the input voltage with the sweep signal. By low frequency is meant from one to 100 pulses per second. In these types of circuits, it is very difficult to provide a low frequency sweep generator that consistently resets itself at a given starting level and at a given point in time. Thus, over long periods of time, such errors are additive and long term integration of the output frequency will not yield sufficiently accurate results to be useful.

BRIEF DESCRIPTION OF THE PRESENT INVENTION

With the foregoing in mind, it is a primary object of the present invention to provide an improved voltage to frequency converting circuit wherein an output signal having a frequency proportional to an input voltage level is provided in a form particularly well suited for long term integration with a high degree of accuracy.

Briefly the basic method of the invention contemplates converting an input voltage signal to a square wave of amplitude corresponding to the voltage level. This square wave is integated to provide a saw tooth wave the slope of which is a function of the amplitude of the square wave. The saw tooth wave is then compared with a fixed reference voltage and a switching signal is generated when the saw tooth crosses the amplitude limits of the fixed reference voltage. This switching signal is utilized in turn to control the frequency of the square wave; that is, it positively drives the converter portion of the circuit so that the frequency of the switching signal itself is a function of the level of the input voltage signal.

As opposed to prior art high frequency converters, the design of the circuit is such that a series of low frequency positive square wave pulses is provided at an output which may readily be counted by a simple counting circuit, the count itself constituting the integration of the parameter or function represented by the input voltage signal. Further, the low frequency is made directly proportional to the input voltage and the circuit design is such that extreme accuracy over long time periods is assured.

BRIEF DESCRIPTION OF THE DRAWINGS

A better understanding of the invention will be had by now referring to a preferred embodiment as illustrated in the accompanying drawings in which.

DETAILED DESCRIPTION OF THE PREFERRED EMBODIMENT

Figure 1:
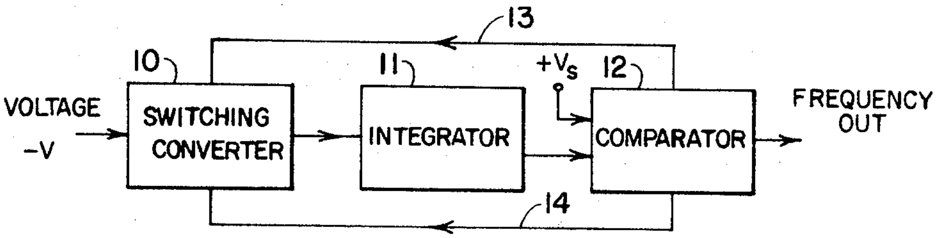
FIG. 1 is a simple block diagram of a circuit for carrying out the invention.

Referring first to FIG. 1 there is illustrated by the block 10 a switching converter receiving an input d.c. voltage signal to provide a square wave output signal which is fed into an integrator circuit 11. The output of the integrator circuit 11 constitutes a saw tooth having a slope which is a function of the input voltage level to the converter 10. This saw tooth wave is passed to a comparator circuit 12 and compared with a fixed reference voltage derived from a regulated voltage source $V_s$. An output switching signal is generated by the comparator on lines 13 and 14 and fed back to the switching converter 10 to positively switch the converter at points in time when the generated saw tooth by the integrator crosses the amplitude limits of the fixed reference voltage. As a result, the frequency of the output switching signal will be a function of the level of the d.c. input voltage.

Figure 2:
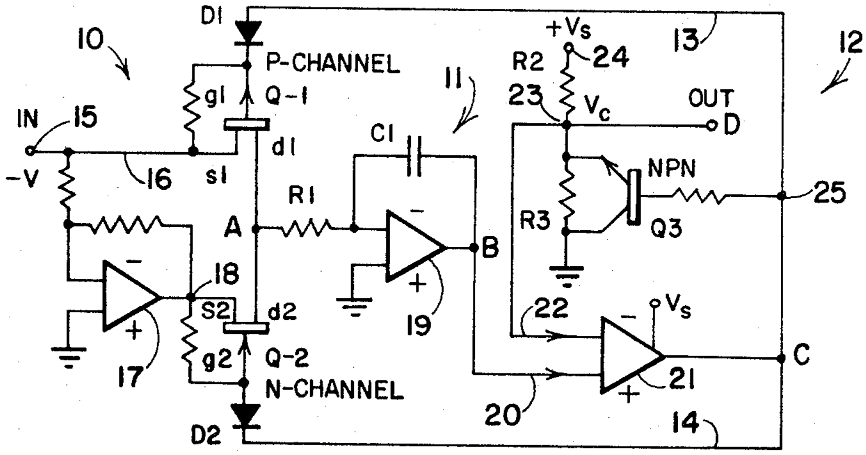
FIG. 2 is a detailed circuit diagram of the various components in the blocks of FIG. 1.

Referring now to FIG. 2, details of the circuit will be described. As shown, there is provided an input terminal 15 which, in the particular embodiment shown, will receive a d.c. negative input voltage which may vary, for example, from −6 to −1 volts depending upon the variations in a given parameter to be integrated. This voltage level is passed through a first lead 16 connecting to a first junction type field effect transistor Q1. The same voltage level, after inversion in polarity by an inverter 17, is simultaneously passed through a second lead 18 to a second junction type field effect transistor Q2. In the particular example shown, the transistor Q1 is a p-channel type and the transistor Q2 an n-channel type, the source terminals *s*1 and *s*2 connecting to the lines 16 and 18 respectively and the drain terminals *d*1 and *d*2 connecting together at a common junction point A.

The transistors Q1 and Q2 function as switches to pass alternately the input voltage signal on the line 16 and the inverted signal on the line 18 to the junction point A. The switching is controlled by voltages on the gate terminals *g*1 and *g*2.

The resulting square wave at the junction point A passes to the integrator 11 as described in FIG. 1. This integrating circuit includes resistance R1 and capacitor C1 fed by a current control amplifier 19 with a current proportional to the input voltage level appearing at the junction A to provide a saw tooth wave form at the output B of the integrator.

The output point B connects through line 20 to a first input of a differential operational amplifier 21 constituting part of the comparator circuit 12. The second input 22 receives a fixed reference voltage $V_c$. This fixed reference voltage is derived from a junction point 23 between first and second voltage dividing resistances R2 and R3 connected between a regulated voltage source terminal 24 and ground as shown. The output from the amplifier is passed to lines 13 and 14 at junction point C.

The circuit is completed by a switch means in the form of an NPN chopper transistor Q3 having its base terminal connected at 25 to receive the output switching signal from the operational amplifier 21. The emitter and collector terminals in turn are connected between the junction point 23 and ground so that when the transistors Q3 is on, the resistance R3 is essentially short circuited and the fixed reference voltage at the junction point 23 is reduced to zero. A preferred output signal is taken from the junction point 23 as indicated at A.

OPERATION

Figure 3:
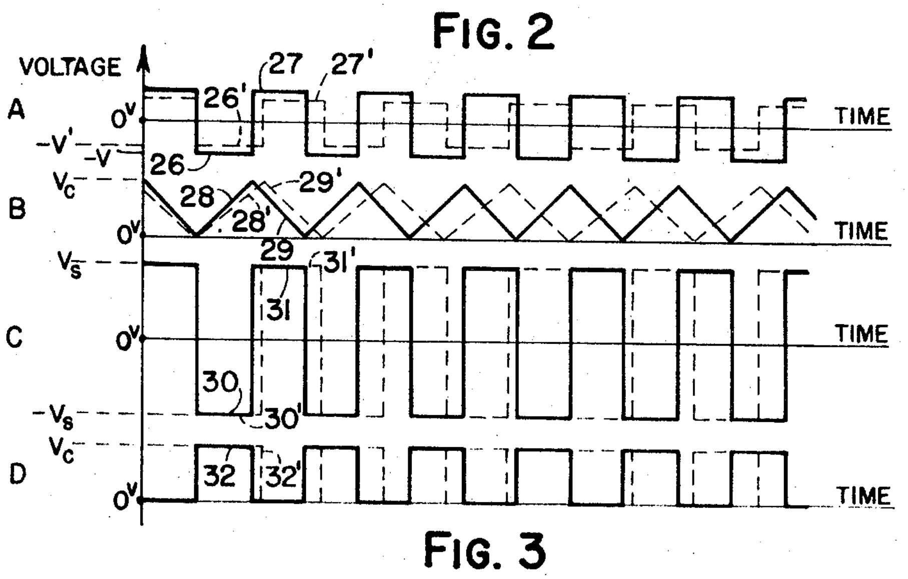
FIG. 3 illustrates a series of wave forms occuring at various points in the circuit of FIG. 2; and, FIG. 4 illustrates additional components which may be provided in combination with the circuit of FIG. 2 to provide for long term digital integration.

The operation of the circuit of FIG. 2 can best be understood by referring to the various wave forms illustrated in FIG. 3. These wave forms represent signals appearing at the correspondingly lettered points A, B, C, and D in FIG. 2. Thus, assume that the initial input d.c. voltage level at the terminal 15 is −V volts. The generated square wave appearing at the junction point A at the output of the switching converter 10 will be as depicted by the wave form A in FIG. 3 and will have equal negative and positive amplitudes below and above the zero voltage line as indicated at 26 and 27 corresponding to −V and +V. When the negative portion 26 passes to the integration circuit 11 of FIG. 2, the capacitor C1 will be charged by current from the amplifier 19 proportional to the voltage portion 26, the rise time being indicated by the saw tooth portion 28. Discharge of the capacitor C1 is depicted by the fall time saw tooth portion 29 which occurs when the input square wave becomes positive as at 27.

The saw tooth portion 28 is passed into the first input line 20 of the differential operational amplifier 21. The fixed reference voltage applied on the second input line 22 derived from the junction point 23, in turn, is shown as having a fixed value $V_c$. The operational amplifier 21 has a very high gain such that when the saw tooth voltage reaches a value corresponding to the fixed reference voltage $V_c$, that is, when this amplitude limit of the fixed reference voltage is crossed by the saw tooth voltage, the output from the amplifier immediately jumps to substantially the supply voltage $V_s$ for the amplifier. This positive voltage generation is indicated by the wave form C wherein the voltage level has changed from the negative level 30 to the positive level 31.

The positive voltage 31 is passed to the base terminal of the switching transistor Q3 at the junction point 25 thereby turning the transistor on and thus effectively short circuiting resistor R3. As a consequence, the reference voltage at the junction point 23 is reduced to zero and the positive output voltage 31 from the operational amplifier 21 will remain at the $V_s$ level during the discharge period of the capacitor C1 represented by the saw tooth portion 29 of wave form B. When the discharge portion 29 crosses the lower limit of zero volts of the reference voltage applied to the differential amplifier, the amplifier output is driven negatively to a negative voltage corresponding substantially to that of the regulated power supply $V_s$. This negative output voltage from the amplifier then switches the transistor Q3 off so that there is again supplied the fixed reference voltage at the junction point 23 corresponding to $V_c$.

Simultaneously with the foregoing events, the switching signal from the output of the operational amplifier is fed back through lines 13 and 14 to the field effect transistors Q1 and Q2. Consider first the negative portion 30 of the output switching signal from the operational amplifier 31. When this negative voltage is applied to the anode of diode *d*1 connecting to the gate terminal *g*1 of the transistor Q1, the gate *g*1 is isolated by the diode and will have the same voltage as the voltage on the source terminal *s*1 on the line 16. This voltage corresponds to the negative d.c. level of the input voltage −V. As a result, the field effect transistor Q1 has its channel opened so that the negative input voltage is passed to the junction point A as shown at 26 in wave form A. On the other hand, when this same negative potential is applied to the field effect transistor Q2 through the line 14 to diode *d*2, the gate *g*2 of transistor Q2 becomes negative relative to the source terminal *s*2 and, being of the opposite n-channel type, has its channel closed to block the positive voltage on the line 18 resulting from inversion of the negative input −V from passing to the junction point A.

When the output switching signal from the operational amplifier 21 switches from its negative to positive value, that is from the level 30 to the level 31 depicted in wave form C of FIG. 3, the positive voltage 31 fed back by the line 13 will be passed by the diode *d*1 to render the gate *g*1 of the transistor Q1 positive relative to the source terminal *s*1 thereby closing the channel and blocking the negative voltage signal on the line 16 from the junction point A. The presence of the positive signal 31 at the transistor Q2 is blocked by the diode *d*2 and thus the gate *g*2 is at the same voltage as the source *s*2 and the transistor channel of Q2 is opened. The positive signal on line 18 is thus passed to the junction point A. This positive portion is indicated at 27 in the wave form A of FIG. 3.

From the foregoing, it will be evident that the inverter switching circuit 10 is positively switched by action of the switching signal at the output of the operational amplifier 21. Further, it will be evident that the frequency of this switching is precisely controlled at the points that the saw tooth wave indicated at B in FIG. 3 crosses the limits of the reference voltage $V_c$ of $+V_c$ and zero volts respectively. The points in time of the cross over of the saw tooth with the amplitude limits of the reference voltage $V_c$ is determined by the level of voltage applied to the integrating circuit which in turn determines the value of charging current. Thus, if the absolute value of the voltage level is close to the reference voltage $V_c$, the time to charge the capacitor to $V_c$ is less than if the voltage level is further away from the reference voltage $V_c$. Therefore, the slope of the saw tooth increases and decreases with increases and decreases in the amplitude of the square wave which in turn is controlled by the input d.c. level of the voltage at terminal 15.

The wave form D in FIG. 3 represents the change in the fixed reference voltage $V_c$ between the fixed value $V_c$ and zero volts. Since the reference voltage is reduced to zero whenever the transistor Q3 is switched on which switching in turn is controlled by the output of the operational amplifier 21, the frequency of the square wave pulses shown in wave form D will be the same as the frequency of the switching signal at point C. Further, since the points in time at which switching occurs depend upon the slope of the saw tooth wave form at junction B, it will be evident that this frequency will be a function of the initial input d.c. voltage level at the terminal 15.

The foregoing is easily illustrated by the dotted line wave forms which depict a situation wherein the input level has decreased slightly. For example, if the intial input level is $-V$ the reduced level is indicated by $-V'$ and is reflected by the new amplitude of the square wave at junction point A depicted by the dotted lines 26' and 27'. Since this amplitude level is further removed from the fixed reference voltage $V_c$, it will take longer for the capacitor C1 to reach the reference voltage $V_c$ and thus the slope of the saw tooth is changed from 28 to that depicted by the dotted line 28'. The fall time slope is indicated at 29' and is similarly of less slope. As a consequence, the generation of the switching signal at the output of the operational amplifier is changed in frequency shown by the dotted line 30' and 31' and finally the output at the output terminal depicted by the wave form D is shown by the dotted pulses 32'.

As a specific example and as illustrated in FIG. 3, if $V_c$ is 10 volts and the values of R1 and C1 chosen so that the time constant for the integrating circuits is 10 volts per second per volt, and if the input voltage d.c. level changes from $-6$ volts to $-5$ volts, a switching action will occur about five times every second as opposed to six times every second. Therefore, as shown by the wave form D, there will be generated about five positive pulses every two seconds as opposed to six positive pulses every two seconds. An increase in the input voltage level from $-6$ volts to $-7$ or $-8$ volts will result in more pulses per unit time being generated at the output rather than less.

While an output signal could be taken from the junction point C in FIG. 2, it is more convenient to count simple positive pulses when utilizing the circuit for long term digital integration and thus preferably the output is taken from the point D in the form of positive pulses as shown in FIG. 3.

Figure 4:
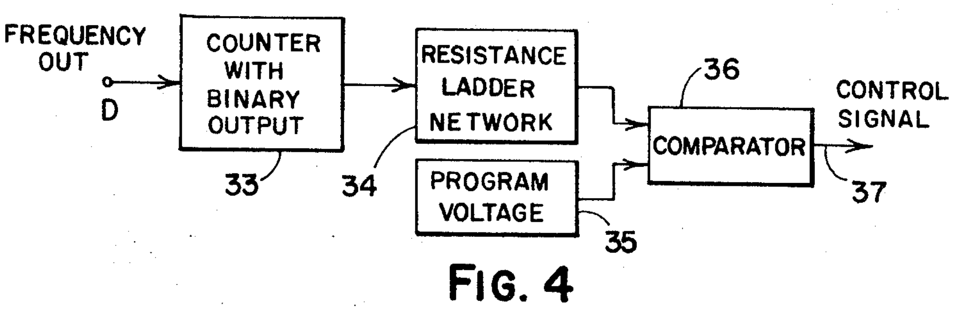

As a specific example of a long term integration system there is shown in FIG. 4 a counter 33 which may be connected directly to receive the output pulses D from the circuit of FIG. 3. The number or sum of counted pulses in the counter 33 is converted to a binary output and passed to a resistance ladder network 34 to provide an output voltage proportional to the total count. This voltage thus represents a long term integration of the input voltage signal to the circuit of FIG. 3.

One practical example of the use of the foregoing circuit components would be in providing a control signal to automatically return a drone or aircraft to its original position after a given distance has been traveled. Thus the velocity of the drone can be integrated by the circuit of FIG. 2 by making the negative input d.c. voltage signal proportional to true air speed. By then counting the output frequency from the circuit of FIG. 2 by the counter 33 of FIG. 4 and converting it to a voltage at the output of 34, the voltage present at any point in time will be proportional to the actual distance traveled by the drone. This voltage may then be compared to a programmed voltage indicated at 35 representing a given distance by means of a comparator 36 so that a control signal 37 will only appear when the drone has actually traveled a distance corresponding to the programmed distance.

It should be understood, however, that the voltage to frequency converter for long term digital integration may have many other applications.

What is claimed is:

1. A method of converting an input d.c. voltage signal to a frequency constituting a function of the level of the input voltage signal, comprising the steps of:

a. converting the input voltage signal to a square wave of amplitude corresponding to said level;
b. integrating the square wave to provide a saw tooth wave the slope of which is a function of the amplitude of the square wave;
c. comparing the saw tooth wave with a fixed reference voltage;
d. generating a switching signal when the saw tooth crosses the amplitude limits of said fixed reference voltage;
e. utilizing said switching signal to control the frequency of said square wave whereby the frequency of the switching signal is a function of the level of said input voltage signal;
f. counting said frequency; and
g. generating an output voltage representative of the total number of counts to thereby provide a long term digital integration system.

2. A voltage to frequency converter for providing an output frequency signal that is a function of the level of an input voltage signal for long term digital integration, comprising, in combination:

a. switching converter means receiving a variable d.c. input voltage signal and providing a square wave output signal of amplitude corresponding to the level of said input voltage signal;
b. integrating means receiving said square wave output signal and converting it to a saw tooth wave having a slope constituting a function of said level of the input voltage signal;
c. comparator means receiving the saw tooth wave and comparing it to a fixed reference voltage to provide an output switching signal when said saw tooth wave crosses the amplitude limits of the reference voltage, the output switching signal being fed back to said switching converter means to switch the converter means, whereby the frequency of switching of the converter means is a function of the level of said d.c. voltage input signal;

d. means for counting said frequency; and e. means for generating an output voltage representative of the total number of counts to thereby provide a long term digital integration system.

3. A voltage to frequency converter for providing an output frequency signal that is a function of the level of an input voltage signal for long term digital integration, comprising, in combination:

a. switching converter means receiving a variable d.c. input voltage signal and providing a square wave output signal of amplitude corresponding to the level of said input voltage signal;

b. integrating means receiving said square wave output signal and converting it to a saw tooth wave having a slope constituting a function of said level of the input voltage signal, c. comparator means receiving the saw tooth wave and comparing it to a fixed reference voltage to provide an output switching signal when said saw tooth wave crosses the amplitude limits of the reference voltage, the output switching signal being fed back to said switching converter means to switch the converter means, whereby the frequency of switching of the converter means is a function of the level of said d.c. voltage input signal, said comparator means including a differential operational amplifier having first and second inputs for receiving respectively said saw tooth wave and said fixed reference voltage; and switch means responsive to said output switching signal for applying and removing said reference voltage to and from said second input, the switching signal at the output of the differential operational amplifier being in the form of a square wave which is negative during the rise time of the saw tooth, the output switching signal becoming positive when the saw tooth wave rises to the reference voltage, said switch means being responsive to the positive output switching signal to reduce the reference voltage to zero, the output switching signal remaining positive during the fall time of the saw tooth, and the output switching signal becoming negative when the saw tooth wave falls to zero voltage to switch the switch means and apply said reference signal, the foregoing process repeating at a frequency determined by the rise and fall time of said saw tooth wave between the limits defined by the amplitude of the reference voltage, and said switching converter means including first and second junction type field effect transistors having their gate terminals connected to receive said output switching signal from said differential operational amplifier; first and second input lines receiving the input voltage signal connected to the source terminals of the transistors, the drain terminals being connected together to define an output junction at which said square wave output signal appears; and an inverter means in the second line for inverting the polarity of the input voltage signal passing to the source terminal of the second transistor, the alternate switching of the first and second transistors resulting in the provision of said square wave of amplitude corresponding to the input d.c. level of the input voltage signal.

4. A voltage to frequency converter for providing an output frequency signal that is a function of the level of an input voltage signal for long term digital integration, comprising, in combination:

a. switching converter means receiving a variable d.c. input voltage signal and providing a square wave output signal of amplitude corresponding to the level of said input voltage signal;

b. integrating means receiving said square wave output signal and converting it to a saw tooth wave having a slope constituting a function of said level of the input voltage signal;

c. comparator means receiving the saw tooth wave and comparing it to a fixed reference voltage to provide an output switching signal when said saw tooth wave crosses the amplitude limits of the reference voltage, the output switching signal being fed back to said switching converter means to switch the converter means, whereby the frequency of switching of the converter means is a function of the level of said d.c. voltage input signal, said comparator means including a differential operational amplifier having first and second inputs for receiving respectively said saw tooth wave and said fixed reference voltage; and switch means responsive to said output switching signal for applying and removing said reference voltage to and from said second input, the switching signal at the output of the differential operational amplifier being in the form of a square wave which is negative during the rise time of the saw tooth, the output switching signal becoming positive when the saw tooth wave rises to the reference voltage, said switch means being responsive to the positive output switching signal to reduce the reference voltage to zero, the output switching signal remaining positive during the fall time of the saw tooth, and the output switching signal becoming negative when the saw tooth wave falls to zero voltage to switch the switch means and apply said reference signal, the foregoing process repeating at a frequency determined by the rise and fall times of said saw tooth wave between the limits defined by the amplitude of the reference voltage; and d. voltage dividing resistances connected between a regulated voltage source and ground, said reference voltage being provided at the junction of said resistances, said junction connecting to the second input of said amplifier, said switch means comprising an NPN transistor having its base connected to receive the output switching signal and its emitter and collector terminals connected between the junction of the resistances and ground respectively so that when said NPN transistor is on, the reference voltage is reduced to zero and when said NPN transistor is off, the fixed reference voltage appears at said junction.

5. A voltage to frequency converter according to claim 4, including an output terminal connected to the junction point at which said reference voltage appears to provide a series of square output pulses at the output frequency and of fixed amplitude corresponding to said fixed reference voltage.

6. A voltage to frequency converter according to claim 5, including, in combination: a counter connected to receive and count said series of output pulses and provide a binary output representing the total count; and a resistance ladder network receiving said binary output to provide an output voltage representing the integration of the counted pulses at any point in time whereby a long term digital integration system results.

7. A voltage to frequency converter according to claim 5, further including a programming device providing a given programmed voltage; and a comparator receiving said programmed voltage and said output voltage from said resistance ladder network to generate a control signal at a point in time when said output voltage equals said programmed voltage.

* * * * *